(12) United States Patent
Kwampian et al.

(10) Patent No.: US 9,056,937 B2
(45) Date of Patent: Jun. 16, 2015

(54) SYSTEM AND METHOD FOR PRODUCING, PREPARING, OR MANUFACTURING NATURAL RUBBER-BASED ABS COMPOSITIONS, POWDERS, SUBSTANCES, AND/OR ADDITIVES

(75) Inventors: Suthep Kwampian, Rayong (TH); Ronnapa Phonthong, Rayong (TH); Worawan Lamtaptimthong, Rayong (TH)

(73) Assignee: THAI ABS COMPANY LTD., Bangkok (TH)

( * ) Notice: Subject to any disclaimer, the term of this patent is extended or adjusted under 35 U.S.C. 154(b) by 545 days.

(21) Appl. No.: 13/376,599

(22) PCT Filed: May 25, 2011

(86) PCT No.: PCT/TH2011/000017
§ 371 (c)(1),
(2), (4) Date: Dec. 7, 2011

(87) PCT Pub. No.: WO2012/161667
PCT Pub. Date: Nov. 29, 2012

(65) Prior Publication Data
US 2012/0302684 A1 Nov. 29, 2012

(51) Int. Cl.
 *C08F 253/00* (2006.01)
 *C08F 279/04* (2006.01)
 *C08L 51/04* (2006.01)
 *C08L 55/02* (2006.01)

(52) U.S. Cl.
 CPC ............. *C08F 253/00* (2013.01); *C08F 279/04* (2013.01); *C08L 51/04* (2013.01); *C08L 55/02* (2013.01)

(58) Field of Classification Search
 CPC ...... C08F 253/00; C08F 279/04; C08L 55/02; C08L 51/04
 USPC .......................................................... 524/423
 See application file for complete search history.

(56) References Cited

U.S. PATENT DOCUMENTS 4,419,496 A 12/1983 Henton

FOREIGN PATENT DOCUMENTS

| JP | 51014945 A | 5/1976 |
|----|------------|--------|
| JP | 60120701 A | 1/1985 |
| JP | 2001288228 A | 10/2001 |
| JP | 2008214481 A | 9/2008 |
| JP | WO2010005054 | 1/2010 |

OTHER PUBLICATIONS

Benny George. "Graft polymerization of methyl methacrylate . . . " J. Elastomers and plastics vol. 38 Oct. 2006.

*Primary Examiner* — Angela C Scott
(74) *Attorney, Agent, or Firm* — Axis Intellectual Capital Pte Ltd; Leif R. Sloan; Sonya C. Harris (57) ABSTRACT

A process for producing natural rubber-based acrylonitrile butadiene styrene (ABS) powder. The process comprises introducing a portion of natural rubber, mixing divinylbenzene (DVB) with the portion of natural rubber to produce vulcanized natural rubber, mixing the vulcanized natural rubber with a monomer solution to produce grafted natural rubber, mixing a plurality of grafted polybutadiene rubbers with the grafted natural rubber to produce a latex masterbatch and mixing a coagulant to a portion of the latex masterbatch to produce natural rubber-based ABS powder. By mixing the DVB with the portion of natural rubber, an intermediate step which is required in conventional methods before the polymerization process, can be eliminated. A natural rubber-based acrylonitrile butadiene styrene (ABS) powder produced by the process is also disclosed.

30 Claims, 1 Drawing Sheet

SYSTEM AND METHOD FOR PRODUCING, PREPARING, OR MANUFACTURING NATURAL RUBBER-BASED ABS COMPOSITIONS, POWDERS, SUBSTANCES, AND/OR ADDITIVES

FIELD OF INVENTION

The present invention relates generally to a method for producing, preparing or manufacturing natural rubber-based ABS compositions, powders, substances and/or additives.

BACKGROUND

Acrylonitrile butadiene styrene (ABS) is a thermoplastic which is primarily used to make light, rigid, molded products such as piping, musical instruments, automotive body parts, whitewater canoes, kitchen appliances and toys. ABS is a high molecular weight organic compound that includes nitrogen atoms. ABS is derived from acrylonitrile, polybutadiene and styrene. Acrylonitrile are synthetic monomers produced from propylene and ammonia and butadiene is a petroleum hydrocarbon obtained from butane. Styrene monomers, derived from coal, are commercially obtained from benzene and ethylene from coal. ABS is a copolymer made by polymerizing styrene and acrylonitrile in the presence of polybutadiene. Typical proportions can vary from 15 to 35% acrylonitrile, 5 to 30% polybutadiene and 40 to 60% styrene.

ABS also has good electrical properties that remain fairly consistent over a wide range of frequencies. These properties are minimally affected by temperature and atmospheric humidity in the acceptable operating range of temperature.

ABS offers many advantages. One of the advantages of ABS is that this material combines the strength and rigidity of acrylonitrile and styrene polymers with the toughness of the polybutadiene rubber. ABS can be made by blending a mixture of butadiene-acrylonitrile rubber with styrene-acrylonitrile resins. By varying the process involved and/or the composition of each constituent, properties of the ABS can be varied accordingly. A variety of modifications can be made to improve impact resistance, toughness and heat resistance. For instance, the impact resistance can be amplified by increasing the proportions of polybutadiene in relation to styrene and acrylonitrile although this causes changes in other properties.

There are many existing methods and techniques for preparing ABS. For example, in U.S. Pat. No. 5,278,253, a process for the continuous preparation of ABS polymers by free-radical-initiated polymerization of styrene and acrylonitrile in the presence of polybutadiene is disclosed. The patent discusses methods for preparing ABS in the presence or absence of solvent and it includes the use of at least 60 to 90% by weight of at least one vinylaromatic monomer, at least 10 to 40% by weight of at least one ethylenically unsaturated monomer and 5 to 30% by weight (based on the total of monomers) of polybutadiene. A reactor cascade comprising at least 3 stirred reactors are used and at least some of which contain internal cooling tubes for dissipating the heat of polymerization, at from 50 to 180° C. The advantage of the process in this patent is that a reasonably high degree of grafting of the rubber is achieved without any problems of heat dissipation, reactor deposits or premature crosslinking.

There are several other different methods, processes and techniques for preparing or producing ABS or ABS-based compositions or products. However, there are various drawbacks or limitation associated with these existing methods, processes and techniques. In particular, these existing methods, processes and techniques involve a number of complicated steps. The more steps involved, the lower the efficiency yield of the resultant product (for example, the ABS or ABS-based compositions or products). Furthermore, the use of polybutadiene (or any other types of synthetic rubbers) in conventional methods of producing ABS or ABS-based compositions or products has adverse effects on the environment. This is mainly due to the large quantities of chemical pollutants produced as a result of synthesizing polybutadiene. Additionally, synthesizing polybutadiene involves high production costs, primarily associated with high material costs, apparatus and manpower.

It is therefore desirable to provide a solution to address at least one of the foregoing problems associated with conventional methods, processes and techniques for preparing or producing ABS or ABS-based compositions or products.

SUMMARY

One of the objects of certain exemplary aspects of the present disclosure is to address the aforementioned exemplary problems and/or to overcome the exemplary deficiencies commonly associated with the prior art as described herein. Accordingly, for example, provided and described herein are certain exemplary embodiments of exemplary methods, processes and techniques for preparing or producing ABS or ABS-based compositions or products.

According to one aspect of the invention, there is provided a process for producing natural rubber-based acrylonitrile butadiene styrene (ABS) powder. The process comprises mixing divinylbenzene (DVB) with a portion of natural rubber to produce vulcanized natural rubber, mixing the vulcanized natural rubber with a monomer solution to produce grafted natural rubber, mixing a plurality of grafted polybutadiene rubbers with the grafted natural rubber to produce a latex masterbatch and mixing a coagulant to a portion of the latex masterbatch to produce natural rubber-based ABS powder.

The process includes introducing between approximately 90 and 100 parts by weight of natural rubber and mixing between approximately 0.1 and 1 parts by weight of divinylbenzene (DVB).

In another aspect, there is provided a process for producing natural rubber-based acrylonitrile butadiene styrene (ABS) product. The process comprises mixing divinylbenzene (DVB) with a portion of natural rubber to produce vulcanized natural rubber, introducing the vulcanized natural rubber, mixing the vulcanized natural rubber with a monomer solution to produce grafted natural rubber, mixing a plurality of grafted polybutadiene rubbers with the grafted natural rubber to produce a latex masterbatch, mixing a coagulant to a portion of the latex masterbatch to produce natural rubber-based ABS powder and mixing a portion of the natural rubber-based ABS powder with a plurality of lubricants to produce a natural rubber-based ABS product.

The process includes introducing approximately 90 and 100 parts by weight of natural rubber and mixing between approximately 0.1 and 1 parts by weight of divinylbenzene (DVB).

In another aspect, there is provided a natural rubber-based acrylonitrile butadiene styrene (ABS) powder. The powder comprises natural rubber, wherein the natural rubber-based acrylonitrile butadiene styrene (ABS) powder is produced by mixing divinylbenzene (DVB) with a portion of natural rubber to produce vulcanized natural rubber, mixing the vulcanized natural rubber with a monomer solution to produce grafted natural rubber, mixing a plurality of grafted polybutadiene rubbers with the grafted natural rubber to produce a latex masterbatch and mixing a coagulant to a portion of the latex masterbatch to produce natural rubber-based ABS powder.

The natural rubber-based acrylonitrile butadiene styrene (ABS) powder includes between approximately 90 and 100 parts by weight of natural rubber and between approximately 0.1 and 1 parts by weight of divinylbenzene (DVB).

BRIEF DESCRIPTION OF THE DRAWINGS

Embodiments of the disclosure are described hereinafter with reference to the following drawings, in which.

DETAILED DESCRIPTION

Embodiments of the present disclosure relate to novel methods, processes, or techniques for producing, preparing, or manufacturing natural rubber-based ABS compositions, powders, substances, and/or additives. More specifically, most embodiments of this disclosure relate to methods, processes, or techniques for producing, preparing, or manufacturing compositions or powders including natural rubber-based ABS. Compositions or powders manufactured in accordance with embodiments of this present disclosure can be referred to as natural rubber-based ABS powders.

The natural rubber-based ABS powders as discussed by this disclosure can substantially reduce adverse environmental impact. This is primarily attributed to the use of natural rubber instead of synthetic rubbers which creates large quantities of chemical pollutants during its manufacturing process. In many embodiments of this disclosure, the natural rubber used does not require any processing prior to the vulcanization process. This results in lower production costs and reduces the output of chemical pollutants. Furthermore, the natural rubber-based ABS powders provided by various embodiments of this disclosure have very good, good or relatively good compatibility with other polymers and/or plastic compounds, compositions or materials.

The method, process, or technique of most embodiments of this disclosure includes a vulcanization process which involves divinylbenzene (DVB) as the crosslinking agent to produce vulcanized rubber before a polymerization process involving styrene and acrylonitrile to produce a raw natural rubber-based ABS powder. By using DVB during the vulcanization process, the vulcanized rubber produced is substantially in liquid form which can exist as a liquid solution, suspension or emulsion. Resultantly, an intermediate step which is required in conventional methods before the polymerization process, can be eliminated. Following the polymerization process, a flocculation process or reaction follows to thereby produce a natural rubber-based ABS powder as a final or resultant product.

The vulcanization process involves mixing, interacting, reacting, combining, joining or blending a portion of a mixture of a plurality of emulsifiers and a catalyst, with natural rubber, a crosslinking agent and at least one deoxidant. The vulcanization process facilitates the formation of an intermediate product or more specifically, vulcanized natural rubber.

In a successive polymerization process, the vulcanized rubber is mixed with a stabilizer, at least one deoxidant, a monomer solution of styrene and acrylonitrile, a transfer agent, a catalyst solution and an emulsifier solution in a reactor. The polymerization process can produce, yield, harvest or give rise to grafted natural rubber.

The flocculation process comprises producing, harvesting or yielding a latex masterbatch before mixing a portion of the latex masterbatch with a coagulant and water to produce, harvest or yield raw natural rubber-based ABS powder. Subsequent process portions of flocculation include filtration and drying to produce, yield, harvest or give rise to the resultant or final product, natural rubber-based ABS powder. The natural rubber-based ABS powder of the embodiments of the present disclosure is in solid state or form, for example, in powder form. Therefore, the natural rubber-based ABS powder can be easily mixed with other plastic or plastic based powders for manufacturing of producing plastic products. Accordingly, there can be good uniformity or homogeneity achieved or established between the natural rubber-based ABS powder of many embodiments of this disclosure and other common plastic or plastic-based powders. This facilitates or allows the natural rubber-based ABS powder to be used and/or applied with existing plastic or plastic powders. The use of the natural rubber-based ABS powder provided by various embodiments of this disclosure can produce, yield or give rise to plastic products which has increased mechanical strength and/or enhanced physical properties.

Following the flocculation process, the natural rubber-based ABS powder have to undergo a compounding process to eventually produce, yield, harvest or give rise to natural rubber-based ABS products.

Representative embodiments of the disclosure are directed to methods, processes and/or techniques for preparing, producing, and/or manufacturing natural rubber-based ABS product including powders, substances, compositions and/or additives are described in detail hereinafter with reference to FIG. 1. This, however, does not preclude various embodiments of the disclosure from other applications where fundamental principles prevalent among the various embodiments of the disclosure such as operational, functional, or performance characteristics are required.

Aspects of Method or Process 100 Embodiments

Figure 1:
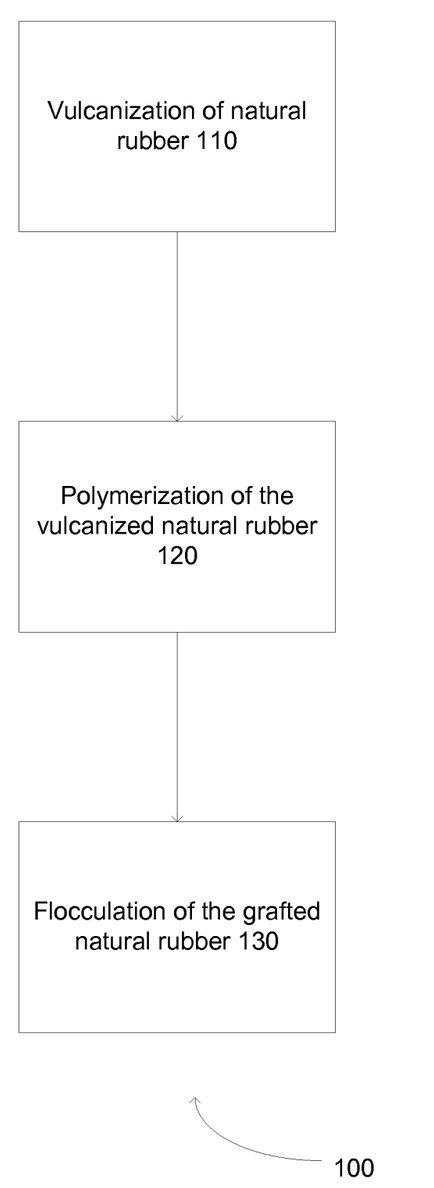
FIG. 1 is a flowchart of a process for producing, preparing, or manufacturing natural rubber-based ABS compositions, powders, substances, and/or additives according to some embodiments of this disclosure.

FIG. 1 is a flowchart of a process for producing, preparing, or manufacturing natural rubber-based ABS compositions, powders, substances, and/or additives according to some embodiments of this disclosure.

Vulcanization of Rubber Process

A vulcanization process 110 is first performed. As will be understood by a person of ordinary skill in the art, vulcanization processes are commonly associated with strengthening and/or enforcing the tensile and/or physical strength of rubber, for example, natural rubber. Natural rubber does not have any crosslinks and is physically soft and weak, relative to synthetic rubbers such as polybutadiene. Specifically, vulcanization is a process by which rubber molecules are crosslinked with each other for strengthening the physical properties of rubber. In particular, crosslinking increases the elasticity and the strength of rubber by about ten-fold.

Conventional methods of vulcanizing rubber involve heating liquid rubber with sulphur or sulphur containing compounds. Examples of such practices are described in, 'Hand book of Plastic Elastomer&composites' (4$^{th}$ Edition. Edited by Charles A. Harper and published by The Mc Graw-Hill companies) and 'Advanced Rubber Composites' (Edited by G. Heinrich and published by springer). The sulphur or sulphur containing compounds are used as crosslinking agents or vulcanizing agents. However, in many embodiment of this disclosure, divinylbenzene (DVB) is used as a crosslinking or vulcanizing agent. The use of DVB as a crosslinking or vulcanizing agent produces, harvests or yields vulcanized natural rubber which is substantially in liquid form which can exist as a liquid solution, suspension or emulsion. This eliminates the need for an intermediate step before the polymerization step 120. By using DVB as a crosslinking or vulcanizing agent, the product as a result of the vulcanization process, for example vulcanized natural rubber can be used directly in the subsequent polymerization step. This circumvents the need or requirement to have an additional step before the polymerization step.

For the vulcanization process 110 according to this disclosure, a number or set of different starting materials, reagents or reactants is required or used. In many embodiments, the set of starting materials, reagents and/or reactants include natural rubber, a plurality of emulsifiers, a catalyst, at least one deoxidant and a cross linking agent. In the following discussion on vulcanization, the quantities of the set of starting materials, reagents and/or reactants including natural rubber, a plurality of emulsifiers, a catalyst, at least one deoxidant and a crosslinking agent are expressed in parts by weight, relative to pre vulcanized natural rubber.

In some embodiments, a plurality of emulsifiers including potassium hydroxide (KOH) and oleic acid can be used for the vulcanization process 110. Additionally, organic peroxides such as tert-Butyl hydroperoxide (TBHP) can be used as a catalyst in the vulcanization process 110. Further, a crosslinking agent such as divinylbenzene (DVB) can be used. The at least one deoxidant includes at least one of lactose, hepta hydrated iron sulphate ($FeSO_4.7H_2O$) and tetra sodium pyrophosphate (TSPP).

In various embodiments, the number or set of starting materials, reagents or reactants include between approximately 90 and 100 parts by weight, for example approximately 100 parts by weight of natural rubber, between approximately 0.1 and 0.4 parts by weight, for example approximately 0.2 parts by weight of KOH, between approximately 0.5 and 2 parts by weight, for example approximately 0.85 parts by weight of oleic acid, between approximately 1 and 3 parts by weight, for example approximately 2 parts by weight of TBHP, between approximately 0.1 and 1 parts by weight, for example 0.5 parts by weight of DVB, between approximately 0.07 and 0.42 parts by weight, for example 0.28 parts by weight of lactose, between approximately 0.001 and 0.006 parts by weight, for example 0.004 parts by weight of $FeSO_4.7H_2O$ and between approximately 0.04 and 0.24 parts by weight, for example 0.16 parts by weight of TSPP.

Depending upon embodiment details, the relative quantities and/or concentrations of the number or set of starting material, reagent and/or reactant can be varied. For instance, the molecular ratio of the emulsifiers, catalysts, at least one deoxidant and/or crosslinking agents can be varied according to the desired strength of the vulcanized rubber required.

The vulcanization process 110 can be carried out, conducted or performed in a reactor, for instance, a 20-liter reactor. However, it should be understood for an ordinary person skilled in the art that other reactors of different volumes, shapes and sizes can also be used for the vulcanization process.

The vulcanization process 110 can include increasing, altering and/or maintaining the temperature of the vulcanization reactor, which can be by way of a heating system, for example heaters. Alternatively, heating furnaces, heat jackets or any other heating equipment known in the art can be used for increasing, altering and/or maintaining the temperature of the reactor.

In various embodiments, a mixture of a plurality of emulsifiers and a catalyst is prepared or produced. A plurality of emulsifiers including KOH and oleic acid are mixed to form an emulsion mixture before a catalyst such as TBHP is added to the emulsion mixture to form a mixture of a plurality of emulsifier and a catalyst. A first portion of the mixture of a plurality of emulsifiers and a catalyst is then introduced into a vulcanization reactor, which is operating at room temperature; between approximately 20 and 30° C. The first portion of the mixture of a plurality of emulsifiers and a catalyst includes approximately 5% of the total or final volume or amount prepared.

Natural rubber is then introduced into the vulcanization reactor. The natural rubber includes latex rubber and is substantially liquid in nature. Upon addition of the first portion of the mixture of a plurality of emulsifiers and a catalyst and natural rubber into the vulcanization reactor, the contents of the vulcanization reactor can be stirred to mix and/or homogenize by way of a stirrer, a magnetic stirrer or agitator. Subsequently, a crosslinking agent including DVB and at least one deoxidant including at least one of $FeSO_4.7H_2O$ and TSPP are introduced into the vulcanization reactor and mixed. KOH and oleic acid, which were previously added as part of the mixture of emulsifiers and catalyst, serve to stabilize the mixture of DVB and natural rubber and TBHP serves to expedite the vulcanization process 110. By introducing the at least one deoxidant into the vulcanization reactor, the operating or reaction temperature of the vulcanization process 110 can be lowered, reduced or decreased.

Subsequent to the introduction of the at least one deoxidant, the vulcanization reactor temperature is increased or raised to between approximately 65 and 75° C., for example between approximately 69 and 71° C. The increment of temperature is carried out over a period of between approximately 25 and 35 minutes, for example, over a period of approximately 30 minutes.

When the temperature has been increased to approximately between 69 and 71° C., a second portion or the remaining portion of the total or final volume or amount of the mixture of a plurality of emulsifiers and a catalyst prepared earlier, for example 95% of the total or final volume or amount prepared, is introduced into the vulcanization reactor over a period of approximately 1 hour. Upon complete introduction of the second portion of the total volume of the mixture of a plurality of emulsifiers and a catalyst, the contents of the vulcanization reactor or the vulcanization reactor is left or maintained for approximately 7 hours for one of facilitating and effectuating completion of the vulcanization process 110.

In many embodiments of this disclosure, the first process portion or the vulcanization process 110, produces an intermediate product, or more specifically, vulcanized natural rubber. The vulcanized natural rubber according to many embodiments of this disclosure is substantially liquid in nature and can exist as a liquid solution, suspension or emulsion. This is distinct from and unlike conventional techniques of vulcanizing rubber where the resultant vulcanized rubber is in solid form.

The present disclosure includes a polymerization process for manufacturing or producing natural rubber-based ABS powder (i.e final or resultant product). The existence of the vulcanized natural rubber as a liquid solution, suspension or emulsion facilitates the following polymerization process 120 by eliminating an intermediate process prior to the polymerization process 120.

Polymerization Process

Subsequently, a polymerization process 120 is performed. As will be understood by a person of ordinary skill in the art, polymerization is a process where monomer molecules react chemically to form polymeric chains. Polymeric chains may consist of one or more monomeric species. Graft polymerization is a process specifically catered to describing a process to produce polymers in which the side chains are structurally distinct from the main chain.

For the polymerization process 120 according to this disclosure, a number or set of different starting materials, reagents or reactants is required or used. In many embodiments, the set of starting materials, reagents and/or reactants include vulcanized natural rubber, a stabilizer, at least one deoxidant, monomers, a transfer agent, a catalyst and a plurality of emulsifiers. In the following discussion on polymerization, the quantities of the set of starting materials, reagents and/or reactants including vulcanized natural rubber, a stabilizer, at least one deoxidant, monomers, a transfer agent, a catalyst and a plurality of emulsifiers are expressed in parts by weight, relative to natural rubber grafted latex with styrene and acrylonitrile copolymer.

In various embodiments, a stabilizer including ammonium hydroxide ($NH_4OH$) is used in the polymerization process 120. The at least one deoxidant includes at least one of lactose, hepta hydrated iron sulphate ($FeSO_4.7H_2O$) and tetra sodium pyrophosphate (TSPP). In addition, monomers including styrene and acrylonitrile can be used in the polymerization process 120. The transfer agent in the polymerization process 120 includes tert-dodecylmercaptan (TDM). The catalyst includes organic peroxide, for example tert-butyl hydroperoxide (TBHP). TBHP can be supplied as a 69-70% aqueous solution. The plurality of emulsifiers for the polymerization process 120 include potassium hydroxide (KOH) and oleic acid.

In many embodiments, the number or set of starting materials, reagents or reactants include between approximately 50 and 70 parts by weight, for example approximately 60 parts by weight of the vulcanized natural rubber, between approximately 1 and 6% parts by weight, for example approximately 3% parts by weight of ammonium hydroxide ($NH_4OH$), between approximately 0.2 and 0.4 parts by weight, for example 0.3 parts by weight of lactose, between approximately 0.0005 and 0.0015 parts by weight, for example 0.001 parts by weight of $FeSO_4.7H_2O$, between approximately 0.05 and 0.15 parts by weight, for example 0.1 parts by weight of TSPP, between approximately 25 and 35 parts by weight, for example 30 parts by weight of styrene, between approximately 5 and 15 parts by weight, for example 10 parts by weight of acrylonitrile, between approximately 0.1 and 0.3 parts by weight, for example 0.2 parts by weight of TDM, between approximately 0.1 and 0.2 parts by weight, for example 0.136 parts by weight of TBHP, between approximately 0.15 and 0.25 parts by weight, for example 0.203 parts by weight of KOH and between approximately 0.5 and 1.5 parts by weight, for example 1.0 parts by weight of oleic acid.

The polymerization process 120 can be carried out, conducted or performed in a reactor, for instance, a 20-liter reactor. However, it should be understood for an ordinary person skilled in the art that other reactors of different volumes, shapes and sizes can also be used for the polymerization process 120.

The polymerization process 120 can include increasing, altering and/or maintaining the temperature of the polymerization reactor, which can be by way of a heating system, for example heaters. Alternatively, heating furnaces, heat jackets or any other heating equipment known in the art can be used for increasing, altering and/or maintaining the temperature of the polymerization reactor.

In representative embodiments of this disclosure, vulcanized natural rubber is introduced into a polymerization reactor, which is operating at room temperature; between approximately 20 and 30° C. The vulcanized natural rubber is substantially in liquid form and includes a liquid solution, suspension or emulsion. Following that, a stabilizer such as $NH_4OH$ is added into the polymerization reactor. The role of the stabilizer is to delay, impede or slow down any form of degradation, for example heat degradation of the vulcanized natural rubber so that an intermediate product can be formed before it degrades.

After the addition or introduction of the stabilizer, the polymerization reactor temperature is increased or raised to between approximately 60 and 70° C., for example between approximately 64 and 66° C. The increment of temperature is carried out over a period of between approximately 25 and 35 minutes, for example, over a period of approximately 30 minutes.

When the temperature has been increased and maintained at approximately between 64 and 66° C., at least one deoxidant including at least one of lactose, $FeSO_4.7H_2O$ and TSPP are introduced into the polymerization reactor. The at least one deoxidant play a role in lowering the operating temperature of the reaction. It is not necessary to add these deoxidants in any specific order. For example, the lactose can be introduced before $FeSO_4.7H_2O$ and then TSPP. In some other embodiments, the $FeSO_4.7H_2O$ is introduced before lactose and TSPP.

Subsequently, a monomer solution of styrene and acrylonitrile is prepared. In some embodiments, a transfer agent such as TDM can be introduced to the monomer solution. Depending upon embodiment details, one or more organic solvents can be used with the styrene and/or acrylonitrile and/or TDM. The organic solvents can include acetone, diethyl ether, ethyl acetate, ethanol, petroleum ether and dichloromethane. TDM facilitates the polymerization process and in many embodiments, expedites the polymerization process. The monomer solution with or without TDM is then introduced into the polymerization reactor and mixed, which is maintained at approximately between 64 and 66° C.

Following that, a catalyst solution of TBHP and an emulsifier solution comprising a plurality of emulsifiers including KOH and oleic acid can be introduced into the polymerization reactor. The TBHP serves to initialize the polymerization process. For many embodiments of this disclosure, it is not necessary that the solution of TBHP and the emulsifier solution of KOH and oleic acid be added in any order. In many embodiments, the contents of the polymerization reactor can be stirred to mix and/or homogenize by way of a stirrer, a magnetic stirrer or agitator.

Subsequent to the introduction of the catalyst solution and the emulsifier solution, the contents in the polymerization reactor are left to stir for approximately 4-5 hours, for example, 4.5 hours. Following that, the polymerization reactor temperature is raised to approximately 65 and 75° C., for example 70° C., over a period of approximately 25 and 35 minutes, for example 30 minutes.

When the polymerization reactor temperature is maintained at approximately 70° C., the reaction or the contents in the polymerization reactor is left for approximately 2.5 and 3.5 hours, for example 3 hours for one of facilitating and effectuating completion of the polymerization process 120. The polymerization reactor can then be cooled and an intermediate product is obtained.

In many embodiments of this disclosure, the second process portion or the polymerization process 120, produces an intermediate product which is substantially in the form of latex that has been grafted and has natural rubber as a constituent. The intermediate product obtained from this polymerization process includes grafted natural rubber.

Flocculation Process

Following the polymerization process 120, a flocculation process 130 is performed. As will be understood by a person of ordinary skill in the art, flocculation refers to the separation of a solution. It is a process whereby colloids are formed in a suspension liquid and during flocculation, fine particles agglomerate or clump together in a floc. The floc may float up or accumulate at the top of the suspension liquid or settle at the bottom of the suspension liquid, which can then be readily separated or harvested by way of a filtration process.

In representative embodiments of this disclosure, the flocculation process 130 includes a portion to produce, harvest or yield a latex masterbatch.

For the flocculation process 130 according to several aspects of this disclosure, a number or set of different starting materials, reagents or reactants is required or used. In many embodiments, the set of starting materials, reagents and/or reactants include grafted natural rubber, a plurality of grafted polybutadiene rubbers, an emulsion resin, a metal deactivator, at least one colour stabilizers, antioxidant and coagulant. Depending upon embodiment details, the plurality of grafted polybutadiene rubbers includes a first grafted polybutadiene rubber and a second grafted polybutadiene rubber. In the following discussion on flocculation, the quantities of the set of starting materials, reagents and/or reactants including grafted natural rubber, a plurality of grafted polybutadiene rubbers, emulsion resin, metal deactivator, at least one colour stabilizer, antioxidant and coagulant are expressed in parts by weight, relative to powdered natural rubber.

In some embodiments, grafted polybutadiene rubbers include small particle-sized grafted polybutadiene rubber (approximately 0.1-0.2 µm) and medium particle-sized grafted polybutadiene rubber (approximately 0.3-0.4 µm) can be used for the flocculation process 130. The first and/or second grafted polybutadiene rubber can be the small particle-sized and/or medium particle-sized grafted polybutadiene rubber. The emulsion resin includes an emulsion mixture of styrene acrylonitrile (E SAN). Additionally, the metal deactivator includes potassium hydroxide (KOH), the at least one colour stabilizer include tetra sodium pyrophosphate (TSPP), sodium dodecyl sulphate (SDS) and potassium hydroxide (KOH), the antioxidant includes phenolic antioxidants such as Octolite 1219 and Wingstay L phenolic antioxidant and the coagulant includes a metal sulphate, for example, magnesium sulphate hepta hydrate and/or mixture of magnesium sulphate hepta hydrate ($MgSO_4.7H_2O$) and sulphuric acid ($H_2SO_4$).

In representative embodiments of this disclosure, the number or set of starting materials, reagents or reactants include between approximately 10 and 20 parts by weight, for example approximately 16.4 parts by weight of the grafted natural rubber, between approximately 20 and 30 parts by weight, for example approximately 24.6 parts by weight of a first grafted polybutadiene rubber, between approximately 35 and 45 parts by weight, for example approximately 41 parts by weight of a second grafted polybutadiene rubber, between approximately 15 and 25 parts by weight, for example 18 parts by weight of an emulsion mixture of styrene acrylonitrile (E SAN), between approximately 0.25 and 0.75 parts by weight, for example 0.5 parts by weight of KOH, between approximately 0.05 and 0.5 parts by weight, for example 0.1 parts by weight of TSPP, approximately 0.05 and 0.5 parts by weight, for example 0.1 parts by weight of SDS and approximately 0.1 and 1 parts by weight, for example 0.21 parts by weight of KOH, between approximately 0.1 and 1 parts by weight, for example 0.5 parts by weight of Wingstay L phenolic antioxidant, between approximately 3 and 8 parts by weight, for example, 4.2 parts by weight of $MgSO_4.7H_2O$.

The flocculation process portion 130 can be carried out, conducted or performed in a reactor, for instance, a 20-liter reactor. However, it should be understood for an ordinary person skilled in the art that other reactors of different volumes, shapes and sizes can also be used for the flocculation process 130. In some embodiments, a set of flocculation reactors including a first flocculation reactor and a second flocculation reactor are used.

The flocculation process 130 detailed below can involve increasing, altering and/or maintaining the temperatures of the set of flocculation reactors, which can be by way of a heating system, for example heaters. Alternatively, heating furnaces, heat jackets or any other heating equipment known in the art can be used for increasing, altering and/or maintaining the temperature of the set of flocculation reactors.

In accordance with several embodiments of this disclosure, the grafted natural rubber from the polymerization process 120 is introduced into a first flocculation reactor which is operating at room temperature; between approximately 20 and 30° C. The grafted natural rubber is substantially in liquid form such as a liquid solution, suspension or emulsion. Depending upon embodiment details, the quantity of the grafted natural rubber can be altered, varied or changed to produce the final product, natural rubber-based powder with different characteristics. For instance, a high quantity of the grafted natural rubber yields natural rubber-based powder with high impact strength and high elongation while a low quantity of such natural rubber yields natural rubber-based powder with high tensile strength and elongation balance.

Thereafter, a plurality of polybutadiene rubbers are introduced into the first flocculation reactor. The plurality of polybutadiene rubbers include a first polybutadiene rubber and a second polybutadiene rubber. The quantities of the first and/or second grafted polybutadiene rubber can affect, alter, vary or change the physical characteristics of the resultant natural rubber-based ABS product. For example, high quantity of the first grafted polybutadiene rubber with large particle size affect high impact strength of the final product, whereas a high quantity of the second grafted polybutadiene rubber with small particle size affect high gloss of the final product. By varying the quantities of the first and/or second grafted polybutadiene rubbers, the properties of the resultant natural rubber-based ABS powder can be altered, varied or changed accordingly. Depending upon the type and/or quantity of the first and/or second grafted polybutadiene rubber, the properties of the resultant natural rubber-based ABS powder can be altered, varied or changed.

Following the addition of the first grafted polybutadiene rubber and the second grafted polybutadiene rubber, the E SAN, KOH (metal deactivator), the at least one colour stabilizer including at least one of TSPP, SDS and KOH and antioxidant are added into the first flocculation reactor. The contents of the first flocculation reactor can be stirred to mix and/or homogenize by way of a stirrer, a magnetic stirrer or agitator.

The KOH (metal deactivator) plays a role in stabilizing fluids by deactivating metal ions and in particular, any iron ions in the reaction mixture. Iron ions originate from the reaction between $FeSO_4.7H_2O$ and lactose in the polymerization process and can still remain in the reaction mixture. The at least one colour stabilizer play a role to prevent degradation from the presence of the catalyst (TBHP) remaining from the polymerization process which can result in colour change of the reaction mixture. The antioxidants are useful for preventing the degradation of the resultant natural rubber-based ABS powder. This can increase the lifespan of the resultant natural rubber-based ABS powder.

It is not necessary to introduce the E SAN, the KOH, the at least one colour stabilizer and the antioxidant in the order as described above. For example, the KOH can be added before the E SAN, followed by the antioxidant and the at least one colour stabilizer. In some embodiments, the E SAN, the KOH, the at least one colour stabilizer and the antioxidant can be added into the first flocculation reactor all at the same time. In many embodiments, it takes approximately an hour for the completion of the reaction.

Following the addition of the E SAN, the KOH, the colour stabilizers and the antioxidant, the contents of the first flocculation reactor is maintained at room temperature, for example between approximately 20° C. and 40° C. for a period of approximately 30 minutes to produce a latex masterbatch. In many embodiments of this disclosure, the latex masterbatch is substantially liquid in nature and can exist as a suspension, gel, emulsion or solution.

Subsequently, between approximately 10 and 15 liters, for example, 12 liters of water is introduced to a second flocculation reactor. The second flocculation reactor operating at room temperature, for example between approximately 20 and 30° C. The water can include at least one of distilled water and de-ionized water. Thereafter, the coagulant including $MgSO_4.7H_2O$ is introduced into the second flocculation reactor before the temperature of the second flocculation reactor is increased to between approximately 90 and 100° C., for example, between approximately 94 and 97° C.

When the second flocculation reactor is maintained at a temperature of between approximately 94 and 97° C. for between approximately 10 and 15 minutes, a portion of the latex masterbatch is introduced into the second flocculation reactor. The latex masterbatch can be introduced into the second flocculation reactor at a controlled rate.

During the addition of the latex masterbatch into the second flocculation reactor, the temperature of the second flocculation reactor is maintained at between approximately 80 and 90° C., for example, between approximately 84 and 86° C. For instance, the introduction of the portion of latex masterbatch is carried out while the second flocculation reactor is at a temperature of between approximately 84 and 86° C. Subsequent to the complete addition of the latex masterbatch, the temperature of the second flocculation reactor is increased or altered to between approximately 92 and 94° C. The increased or altered temperature of between approximately 92 and 94° C., facilitates, enables or expedites the flocculation process. The temperature variation prior to, during and after the addition of the latex masterbatch can affect the resultant particle size of the final product.

Upon the increment or alteration of the second flocculation reactor temperature to between approximately 92 and 94° C., the second flocculation reactor is left or maintained at between approximately 92 and 94° C. for approximately 15 and 30 minutes for one of facilitating and effectuating completion of the flocculation of the latex masterbatch. By mixing the coagulant and the latex masterbatch, the flocculation reaction occurs in the second flocculation reactor. More specifically, flocculation of the latex masterbatch occurs in the reactor with the aid, help or assistance of the coagulant. The resultant particle size of powder is approximately 500 μm.

The flocculation process 130 produces, harvests or yields a resultant product, which includes raw natural rubber-based ABS powder. The raw natural rubber-based ABS powder is produced as a suspended substance, product, or powder in water.

Subsequently, the raw natural rubber-based ABS powder is harvested or separated from water and/or any residual unreacted reactants and/or by-products present in the second flocculation reactor. This can be done or carried out by way of a filtration process where the flocculation process 130 includes filtering the raw natural rubber-based ABS powder. In a representative embodiment, a large-scale filtration apparatus, for example, a conveyor belt is used. This can remove between approximately 40 and 60% of the moisture in the raw natural rubber-based ABS powder.

Following the filtration process, the retenate, residue or filtrand is dried. Drying of the retenate, residue or filtrand can be performed by way of a baking or heating process in an oven, a flash dryer or a tornesh dryer at a temperature of between approximately 70 and 100° C., for example, 80° C., for a predetermined period of time, for example, approximately 24 hours. The dried retenate, residue or filtrand includes the final product, natural rubber-based ABS powder. The natural rubber-based ABS powder provided by various embodiments of this disclosure will undergo a compounding process to produce products with natural rubber-based ABS powder as a constituent or additive.

The natural rubber-based ABS powder of the embodiments of the present disclosure is in solid state or form, for example, in powder form. Therefore, the natural rubber-based ABS powder can be easily, more easily or better mixed with other plastic or plastic based powders for manufacturing of producing plastic products. Accordingly, there can be good uniformity or homogeneity achieved or established between the natural rubber-based ABS powder of many embodiments of this disclosure and other common plastic or plastic-based powders. This facilitates or allows the natural rubber-based ABS powder to be used and/or applied with existing plastic or plastic powders. The use of the natural rubber-based ABS powder provided by various embodiments of this disclosure can produce, yield or give rise to plastic products which has increased mechanical strength and/or enhanced physical properties. The natural rubber-based powder is easy to handle and work with.

To produce, yield or give rise to plastic products including natural rubber-based ABS product, the natural rubber-based ABS powder has to undergo an additional compounding process.

Compounding Process

A compounding process 140 is carried out to produce, yield or give rise to plastic products, including natural rubber-based ABS product. As will be understood by a person of ordinary skill in the art, compounding is the process of mixing various additives with a base plastic material, for example, the natural rubber-based ABS powder. Most plastic materials cannot be processed in their post polymerization or flocculation condition. Post polymerized or flocculated plastic material must be enhanced, for example, with compounding additives for processing. Plastic materials without process additives decompose during processing and produce physically weak products. Compounding of additives plays a significant role in modifying the physical properties, imparting technical advantages and enhancing the performance characteristics of plastic materials in all their product application. The compounding process 140 facilitates the strengthening of any resultant plastic products.

For the compounding process 140 according to this disclosure, a number or set of different starting materials, reagents or reactants is required or used. In many embodiments, the set of starting materials, reagents and/or reactants include the natural rubber-based ABS powder, styrene acrylonitrile resin (SAN) and lubricants. In the following discussion on the compounding process, the quantities of the set of starting materials, reagents and/or reactants including the natural rubber-based ABS powder, styrene acrylonitrile resin (SAN) and lubricants are expressed in parts by weight, relative to the ABS powder and the SAN.

In many embodiments of this disclosure, the lubricants used in the compounding process 140 includes Ethylene bis stearamide (EBS), Calcium stearate (Ca-st) and silicone oil (Si-Oil).

In various embodiments, the number or set of starting materials, reagents or reactants include between approximately 20 and 60 parts by weight, for example approximately 40 parts by weight of the natural rubber-based ABS powder, between approximately 40 and 80 parts by weight, for example approximately 60 parts by weight of SAN, between approximately 0.2 and 3 parts by weight, for example approximately 0.5 parts by weight of EBS, between approximately 0.05 and 2.0 parts by weight, for example approximately 0.2 parts by weight of Ca-st and between approximately 0.01 and 1 parts by weight, for example 0.05 parts by weight of Si-Oil.

The compounding process 140 can be carried out, conducted or performed in a compounding mixer or extruder, for instance, a Twin screw extruder having diameter 26 mm and length to diameter ratio L:D of 40 (Model: LABTECH LTE26-40/15 kW). The compounding mixer or extruder can be fully automated or semi automated.

In many embodiments, the natural rubber-based ABS powder from the flocculation process 130 is introduced into a compounding mixer or extruder operating at room temperature; between approximately 20 and 40° C. Following the addition of the natural rubber-based ABS powder, the SAN is added into the compounding mixer or extruder before the lubricants such as EBS, Ca-st and Si-Oil are introduced into the compounding mixer or extruder. The lubricants facilitate the compounding process by allowing or making the natural rubber-based ABS powder flexible.

After the introduction of the natural rubber-based ABS powder, the SAN and the lubricants into the compounding mixer or extruder, the contents are all mixed and subsequently, the contents are melted at a temperature of between approximately 190 and 210° C.

Thereafter, the melted contents are forced out through a die to produce plastic products of the desired shapes and sizes. The plastic products have natural rubber-based ABS powder as a constituent. The shape and size of the die determines the outcome of the plastic products. In many embodiments of this disclosure, the shape of the die includes round, rectangular and cylindrical.

EXAMPLE 1

A first example of preparing natural rubber-based acrylonitrile butadiene styrene (ABS) powder or composition in accordance with embodiments of this disclosure is described hereinafter.

A first process is carried out to strengthen natural rubber. This is followed by a second process for producing grafted natural rubber, which exists substantially as a liquid, for example, in the form of latex. The process also includes a third process to produce the natural rubber-based ABS powder before undergoing a fourth process to form a plastic product with natural rubber-based ABS as a constituent. The first, second, third and fourth processes can correspond to the vulcanization process 110, the polymerization process 120, the flocculation process 130 and the compounding process 140 described in this disclosure.

Reactants, reagents or starting materials for the first process is presented in Table 1 below. The quantity of the reactants, reagents or starting materials in Table 1 is presented in parts by weight, relative to pre vulcanized rubber.

A mixture of a plurality of emulsifiers and a catalyst is first prepared. The emulsifiers include KOH and oleic acid and the catalyst includes TBHP. The emulsifiers include 0.2 parts by weight of KOH and 0.85 parts by weight of oleic acid. The catalyst includes 2 parts by weight of TBHP. The TBHP is added to a mixture of KOH and oleic acid and left to stir at room temperature using a stirrer.

Following that, the first process is performed in a 20 liter reactor by introducing 5% by volume of the prepared mixture of emulsifier and catalyst into the reactor, which is operating at room temperature. Natural rubber of 100 parts by weight (100%) is added into the reactor and the reaction is left to stir. A crosslinking agent and three deoxidants are introduced to the reaction mixture. The cross linking agent includes 0.5 parts by weight of DVB. The deoxidants include 0.28 parts by weight of lactose, 0.004 parts by weight of $FeSO_4.7H_2O$ and 0.16 parts by weight of TSPP. The temperature of the reactor is then increased to 70° C. over a period of 30 minutes.

When the temperature of the reactor is maintained at 70° C., the remaining portion of the mixture of emulsifier and catalyst is introduced into the reactor over a period of 1 hour. Thereafter the reaction mixture is left to stir for 7 hours.

The reactor is then cooled. The first process produced an intermediate product or vulcanized natural rubber.

A second process follows the first process described above. Reactants, reagents or starting materials for the second process are detailed in Table 2 below. The quantity of the reactants, reagents or starting materials in Table 2 is presented in parts by weight, relative to natural rubber grafted latex with styrene and acrylonitrile copolymer.

The second process begins with introducing 60% of vulcanized natural rubber into a 20-liter polymerization reactor operating at room temperature. The vulcanized rubber is left to stir in the reactor using a stirrer. A stabilizer is then introduced into the reactor. The stabilizer includes 0.6 parts per hundred resin (phr) of ammonium hydroxide ($NH_4OH$) at 3-15% concentration. After the addition of $NH_4OH$, the reactor temperature is increased to 65° C. The increment of the temperature is carried out over a period of 30 minutes. When the temperature is maintained at 65° C., 3 deoxidants are introduced into the reactor. The deoxidants include 0.3 parts by weight of lactose, 0.001 parts by weight of $FeSO_4.7H_2O$ and 0.1 parts by weight of TSPP.

Monomer solution of styrene and acrylonitrile is then added into the reactor together with a transfer agent such as tert-dodecylmercaptan (TDM). The monomer solution includes 30% of styrene, 10% of acrylonitrile and 0.2 parts by weight of TDM. Following that, a catalyst solution and an emulsifier solution are introduced into the reaction. The catalyst solution is 0.136 parts by weight of TBHP, which is supplied as a 69-70% aqueous solution. The emulsifier solution includes 0.203 parts by weight of KOH and 1 parts by weight of oleic acid.

Thereafter, the reaction mixture is left to stir at 4.5 hours at 65° C. before the reactor temperature is increased to 70° C. over 30 minutes. When the reactor temperature is maintained at 70° C., the reaction mixture is left to stir for 3 hours to complete the second process. The second process produces an intermediate product that has natural rubber as a constituent. The intermediate product includes grafted natural rubber.

A third process follows the second process. Reactants, reagents or starting materials for the third process are summarized in Table 3. The quantity of the reactants, reagents or starting materials in Table 3 is presented in parts by weight, relative to powdered natural rubber.

The third process starts by creating a latex masterbatch which involves adding 16.4% of grafted natural rubber into a flocculation reactor operating at room temperature. Following that, 24.6% of a first grafted polybutadiene rubber, for example, small particle-sized grafted polybutadiene rubber and 41% of a second grafted polybutadiene rubber, for example, medium particle-sized grafted polybutadiene rubber are added into the reactor. Subsequently, 18% of an emulsion mixture of styrene acrylonitrile is introduced into the reactor. The reaction is left to stir using a stirrer.

After that, a metal deactivator, three colour stabilizers and an antioxidant are introduced to the reaction mixture. The metal deactivator includes 0.5 parts by weight of KOH, the colour stabilizers include 0.1 parts by weight of TSPP, 0.1 parts by weight of SDS and 0.21 parts by weight of KOH and the antioxidant includes 0.5 parts by weight of Wingstay L phenolic antioxidant. Upon allowing the reaction mixture to rest for approximately 30 minutes, latex masterbatch is produced.

Subsequently, 12 liters of de-ionized water is introduced to a separate 20-liter reactor operating at room temperature. A coagulant, $MgSO_4.7H_2O$ is then introduced to the reactor. The coagulant includes 4.2 parts by weight of $MgSO_4.7H_2O$. The temperature of the reactor is then increased to 95° C. and maintained at a temperature of 85° C. before a portion, approximately 9 liters of the latex masterbatch is added to the reactor. The temperature of the reactor is then increased to between approximately 92 to 94° C. and then left for approximately 30 minutes to complete the third process. The third process produces natural rubber-based ABS powder.

A filtration process can be performed for separating or harvesting the natural rubber-based ABS powder from the residual reactants and/or impurities still present in the reactor. The natural rubber-based ABS powder is then dried in an oven at approximately 80° C. for 24 hours.

The process further includes a fourth process following the filtration process. The fourth process is employed to convert raw polymer or base to polymer resin with twin screw extruder.

Reactants, reagents or starting materials for the fourth process are summarized in Table 4. The quantity of the reactants, reagents or starting materials in Table 4 is presented in parts by weight, relative to the ABS powder and the SAN.

The fourth process is initiated by introducing 40% of the dried natural rubber-based ABS powder into a mixer vessel at room temperature. 60% of SAN is then introduced into the mixer vessel. This is followed by adding lubricants into the mixer vessel. The lubricants include 0.5 parts by weight of EBS, 0.2 parts by weight of Ca-st and 0.05 parts by weight of Si-Oil. The ABS powder, SAN and the lubricants are mixed using a low speed mixer for 5 minutes until it is well mixed before the mixture is fed to a twin screw extruder for compounding and pelletizing.

Twin screw extruder having diameter 26 mm and length to diameter ratio L:D of 40 is used for the compounding process. The temperature profile and compounding conditions of the twin screw extruder are shown in Table 5.

Table 6 shows the physical properties of natural rubber-based ABS powders with different compositions of natural rubber (NR).

TABLE 1

Reactants, reagents or starting materials for the first process

| Reactants/reagents/starting materials | Quantity |
|---|---|
| Emulsifier - potassium hydroxide (KOH) | 0.2 parts by weight |
| Emulsifier - oleic acid | 0.85 parts by weight |
| Catalyst - tert-Butyl hydroperoxide (TBHP) | 2 parts by weight |
| Natural rubber | 100% |
| Crosslinking agent - divinylbenzene (DVB) | 0.5 parts by weight |
| Deoxidant - lactose | 0.28 parts by weight |
| Deoxidant - hepta hydrated iron sulphate ($FeSO_4 \cdot 7H_2O$) | 0.004 parts by weight |
| Deoxidant - tetra sodium pyrophosphate (TSPP) | 0.16 parts by weight |

TABLE 2

Reactants, reagents or starting materials for the second process

| Reactants/reagents/starting materials | Quantity |
|---|---|
| Vulcanized natural rubber | 60% |
| Stabilizer - ammonium hydroxide ($NH_4OH$) 3-15% concentration | 0.6 parts by weight |
| Deoxidant - lactose | 0.3 parts by weight |
| Deoxidant - hepta hydrated iron sulphate ($FeSO_4 \cdot 7H_2O$) | 0.001 parts by weight |
| Deoxidant - tetra sodium pyrophosphate (TSPP) | 0.1 parts by weight |
| Monomer - styrene | 30% |
| Monomer - acrylonitrile | 10% |
| Transfer agent - tert-dodecylmercaptan (TDM) | 0.2 parts by weight |
| Catalyst - tert-Butyl hydroperoxide (TBHP) 69-70% aqueous solution | 0.136 parts by weight |
| Emulsifier - potassium hydroxide (KOH) | 0.203 parts by weight |
| Emulsifier - oleic acid | 1 parts by weight |

TABLE 3

Reactants, reagents or starting materials for the third process

| Reactants/reagents/starting materials | Quantity |
|---|---|
| Grafted natural rubber | 16.4% |
| First polybutadiene rubber | 24.6% |
| Second polybutadiene rubber | 41% |
| Styrene Acrylonitrile emulsion mixture (E SAN) | 18% |
| Metal deactivator - potassium hydroxide (KOH) | 0.5 parts by weight |
| Colour stabilizer - tetra sodium pyrophosphate (TSPP) | 0.1 parts by weight |
| Colour stabilizer - sodium dodecyl sulphate (SDS) | 0.1 parts by weight |
| Colour stabilizer - potassium hydroxide (KOH) | 0.21 parts by weight |
| Anitoxidant - | 0.5 parts by weight |
| Coagulant - magnesium sulphate hepta hydrate ($MgSO_4 \cdot 7H_2O$) | 4.2 parts by weight |

TABLE 4

Reactants, reagents or starting materials for the fourth process

| Reactants/reagents/starting materials | Quantity |
|---|---|
| Natural rubber-based ABS powder | 40% |
| SAN | 60% |
| Lubricant - EBS | 0.5 parts by weight |
| Lubricant - Ca-st | 0.2 parts by weight |
| Lubricant - Si-Oil | 0.05 parts by weight |

TABLE 5

Compounding conditions of twin screw extruder

| Conditions | Values | Unit |
|---|---|---|
| Temperature | Zone 1-2: 170<br>Zone 3-6: 180<br>Zone 7-8: 190<br>Zone 9-10: 200 | °C. |
| Screw speed (main screw) | 150-200 | Rpm |
| Cutter speed | 10-15 | rpm |
| Out put | 5-10 | Kg./hrs. |

TABLE 6

Physical properties of natural rubber-based ABS powders with different compositions of natural rubber (NR)

| | Value | | | |
|---|---|---|---|---|
| Test Item | 0% NR | 4% NR | 10% NR | Unit |
| MFI (220/10) | 19.2 | 18.7 | 18.8 | g/10 min |
| Izod Impact | 26.0 | 24.4 | 21.2 | kg-cm/cm2 |
| Rockwell Hardness | 110 | 111 | 105 | R-Scale |
| Tensile Strength | 460 | 465 | 392 | Kg/cm2 |
| Elongation | 10 | 13 | 29 | % |
| Flexural Strength | 612 | 646 | 553 | ×10e4 kg/cm2 |
| Flexural Modulus | 2.11 | 2.29 | 2.06 | ×10e4 kg/cm2 |
| HDT (N) | 86.4 | 84.0 | 82.7 | °C. |

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. A process for producing natural rubber-based acrylonitrile butadiene styrene (ABS) powder, the process comprising:
   mixing divinylbenzene (DVB) with a portion of natural rubber to produce vulcanized natural rubber;
   mixing the vulcanized natural rubber with a monomer solution to produce grafted natural rubber, wherein the monomer solution comprises styrene and acrylonitrile;
   mixing a plurality of grafted polybutadiene rubbers with the grafted natural rubber to produce a latex masterbatch; and
   mixing a coagulant to a portion of the latex masterbatch to produce natural rubber-based ABS powder.

2. The process of claim 1, wherein the portion of natural rubber includes between approximately 90 and 100 parts by weight of natural rubber.

3. The process of claim 1, wherein the divinylbenzene (DVB) includes between approximately 0.1 and 1 parts by weight of divinylbenzene (DVB).

4. The process of claim 1, wherein the monomer solution includes between approximately 25 and 35 parts by weight of styrene and approximately 5 and 15 parts by weight of acrylonitrile.

5. The process of claim 1, wherein mixing divinylbenzene (DVB) with a portion of natural rubber to produce vulcanized natural rubber is carried out in a vulcanization reactor.

6. The process of claim 5, further comprising:
   producing a mixture of emulsifiers and a catalyst, the mixture of emulsifiers and a catalyst includes between approximately 0.1 and 0.4 parts by weight of potassium hydroxide (KOH), approximately 0.5 and 2 parts by weight of oleic acid and 1 and 3 parts by weight of tert-butyl hydroperoxide (TBHP).

7. The process of claim 5, further comprising:
   introducing deoxidants, the deoxidants include between approximately 0.07 and 0.42 parts by weight of lactose, approximately 0.001 and 0.006 parts by weight of hepta hydrated iron sulphate (FeSO4.7H2O) and approximately 0.04 and 0.24 parts by weight of tetra sodium pyrophosphate (TSPP).

8. The process of claim 1, wherein mixing the vulcanized natural rubber with a monomer solution to produce grafted natural rubber is carried out in a polymerization reactor.

9. The process of claim 8, further comprising:
   introducing deoxidants, the deoxidants include between approximately 0.2 and 0.4 parts by weight of lactose, approximately 0.0005 and 0.0015 parts by weight of hepta hydrated iron sulphate (FeSO4.7H2O) and approximately 0.05 and 0.15 parts by weight of tetra sodium pyrophosphate (TSPP).

10. The process of claim 8, further comprising:
    introducing a stabilizer, the stabilizer includes between approximately 1 and 6% parts by weight of ammonium hydroxide (NH4OH).

11. The process of claim 8, further comprising:
    introducing a catalyst solution, the catalyst solution includes between approximately 0.1 and 0.2 parts by weight of tert-butyl hydroperoxide (TBHP); and
    introducing an emulsifier solution, the emulsifier solution includes between approximately 0.15 and 0.25 parts by weight of potassium hydroxide (KOH) and approximately 0.5 and 1.5 parts by weight of oleic acid.

12. The process of claim 1, wherein mixing a plurality of grafted polybutadiene rubbers with the grafted natural rubber to produce a latex masterbatch is carried out in a first flocculation reactor.

13. The process of claim 12, further comprising:
    introducing color stabilizers, the color stabilizers include between approximately 0.05 and 0.5 parts by weight of tetra sodium pyrophosphate (TSPP), approximately 0.05 and 0.5 part by weight of sodium dodecyl sulphate (SDS) and approximately 0.1 and 1 parts by weight of potassium hydroxide (KOH).

14. The process of claim 12, further comprising:
    introducing an emulsion mixture, a metal deactivator and an antioxidant, the emulsion mixture, the metal deactivator and the antioxidant include between approximately 15 and 25 parts by weight of an emulsion mixture of styrene acrylonitirle, between approximately 0.25 and 0.75 parts by weight of potassium hydroxide (KOH), and between approximately 0.1 and 1 parts by weight of a phenolic antioxidant.

15. The process of claim 1, wherein mixing a coagulant to a portion of the latex masterbatch to produce natural rubber-based ABS powder is carried out in a second flocculation reactor.

16. The process of claim 15, further comprising:
    introducing a coagulant, the coagulant includes between approximately 3 and 8 parts by weight of magnesium sulphate hepta hydrate (MgSO4.7H2O).

17. A process for producing natural rubber-based acrylonitrile butadiene styrene (ABS) product, the process comprising:

mixing divinylbenzene (DVB) with a portion of natural rubber to produce vulcanized natural rubber;

mixing the vulcanized natural rubber with a monomer solution to produce grafted natural rubber, wherein the monomer solution comprises styrene and acrylonitrile;

mixing a plurality of grafted polybutadiene rubbers with the grafted natural rubber to produce a latex masterbatch;

mixing a coagulant to a portion of the latex masterbatch to produce natural rubber-based ABS powder; and mixing a portion of the natural rubber-based ABS powder with a plurality of lubricants to produce a natural rubber-based ABS product.

18. The process of claim 17, wherein the portion of natural rubber includes between approximately 90 and 100 parts by weight of natural rubber.

19. The process of claim 17, wherein the divinylbenzene (DVB) includes between approximately 0.1 and 1 parts by weight of divinylbenzene (DVB).

20. The process of claim 17, wherein the monomer solution includes between approximately 25 and 35 parts by weight of styrene and approximately 5 and 15 parts by weight of acrylonitrile.

21. The process of claim 17, wherein the portion of the natural rubber-based ABS powder includes between approximately 20 and 60 parts by weight of the natural rubber-based ABS powder.

22. The process of claim 17, wherein the plurality of lubricants includes between approximately 0.2 and 3 parts by weight of ethylene bis stearamide (EBS), approximately 0.05 and 2 parts by weight of calcium stearate (Ca-st) and approximately 0.01 and 1 parts by weight of silicone oil (Si-Oil).

23. The process of claim 17, wherein mixing divinylbenzene (DVB) with a portion of natural rubber to produce vulcanized natural rubber is carried out in a vulcanization reactor.

24. The process of claim 17, wherein mixing the vulcanized natural rubber with a monomer solution to produce grafted natural rubber is carried out in a polymerization reactor.

25. The process of claim 17, wherein mixing a plurality of grafted polybutadiene rubbers with the grafted natural rubber to produce a latex masterbatch is carried out in a first flocculation reactor.

26. The process of claim 17, wherein mixing a coagulant to a portion of the latex masterbatch to produce natural rubber-based ABS powder is carried out in a second flocculation reactor.

27. The process of claim 17, wherein mixing a portion of the natural rubber-based ABS powder with a plurality of lubricants to produce a natural rubber-based ABS product is carried out in a compounding reactor.

28. A natural rubber-based acrylonitrile butadiene styrene (ABS) powder comprising:

natural rubber, wherein the natural rubber-based acrylonitrile butadiene styrene (ABS) powder is produced by mixing divinylbenzene (DVB) with a portion of natural rubber to produce vulcanized natural rubber, mixing the vulcanized natural rubber with a monomer solution comprising styrene and acrylonitrile to produce grafted natural rubber, mixing a plurality of grafted polybutadiene rubbers with the grafted natural rubber to produce a latex masterbatch and mixing a coagulant to a portion of the latex masterbatch to produce natural rubber-based ABS powder.

29. The powder of claim 28, wherein the portion of natural rubber includes between approximately 90 and 100 parts by weight of natural rubber.

30. The powder of claim 28, wherein the divinylbenzene (DVB) includes between approximately 0.1 and 1 parts by weight of divinylbenzene (DVB).

* * * * *